United States Patent [19]
Garfall

[11] 4,043,662
[45] Aug. 23, 1977

[54] PHOTOGRAPHIC LIGHT SOURCE

[76] Inventor: Peter J. Garfall, 4 Greystone Road, Melrose, Mass. 02176

[21] Appl. No.: 612,012

[22] Filed: Sept. 10, 1975

[51] Int. Cl.$^2$ ............................................ G03B 27/76
[52] U.S. Cl. ...................................... 355/71; 355/67; 355/69; 355/70; 355/75; 240/1.3; 240/2 C; 240/2 AT
[58] Field of Search ...................... 355/67, 68, 69, 70, 355/71, 75; 240/2 AT, 2 AD, 2 D, 1.3, 2 C

[56] References Cited

U.S. PATENT DOCUMENTS

| | | | |
|---|---|---|---|
| 1,600,709 | 9/1926 | Bhosys | 355/70 |
| 2,351,031 | 6/1944 | Froelich | 240/2 D |
| 2,433,133 | 12/1947 | Lindsey | 355/70 |
| 3,586,849 | 6/1971 | Starkweather et al. | 355/70 |
| 3,609,039 | 9/1971 | Ambraschka | 355/70 |
| 3,669,538 | 6/1972 | Fowler | 355/67 |
| 3,777,135 | 12/1973 | Rees | 240/41.35 R |

OTHER PUBLICATIONS

*Photographic Applications in Science, Technology & Medicine*, article & advertisement "Aristo DA-10", July, 1973.

IEEE Standard Dictionary of Electrical and Electronic Terms, p. 285.

*Primary Examiner*—Russell E. Adams
*Attorney, Agent, or Firm*—Edgar H. Kent

[57] ABSTRACT

A photographic light source has a boxlike frame with sockets for mounting and electrically connecting, for continuous operation, fluorescent white light tubes of conventional type distributed about the inner sides of the frame and extending longitudinally of them. Reflectors with light diffusing reflecting surfaces are mounted to extend between the sockets and about light tubes mounted therein, the reflectors having a position in which most of the light from the tubes is directed and reflected into the frame and mainly toward one face of it. The mixture of direct and reflected light reflected by a subject within the frame, or outside that face of it, toward a camera directed into the opposite face of the frame, provides effective lighting for color or black and white pictures, with the predominant green of directly reflected light from such tubes desirably suppressed. Adapters are provided for using the frame for slide viewing and photographing.

17 Claims, 8 Drawing Figures

U.S. Patent Aug. 23, 1977 Sheet 1 of 4 4,043,662
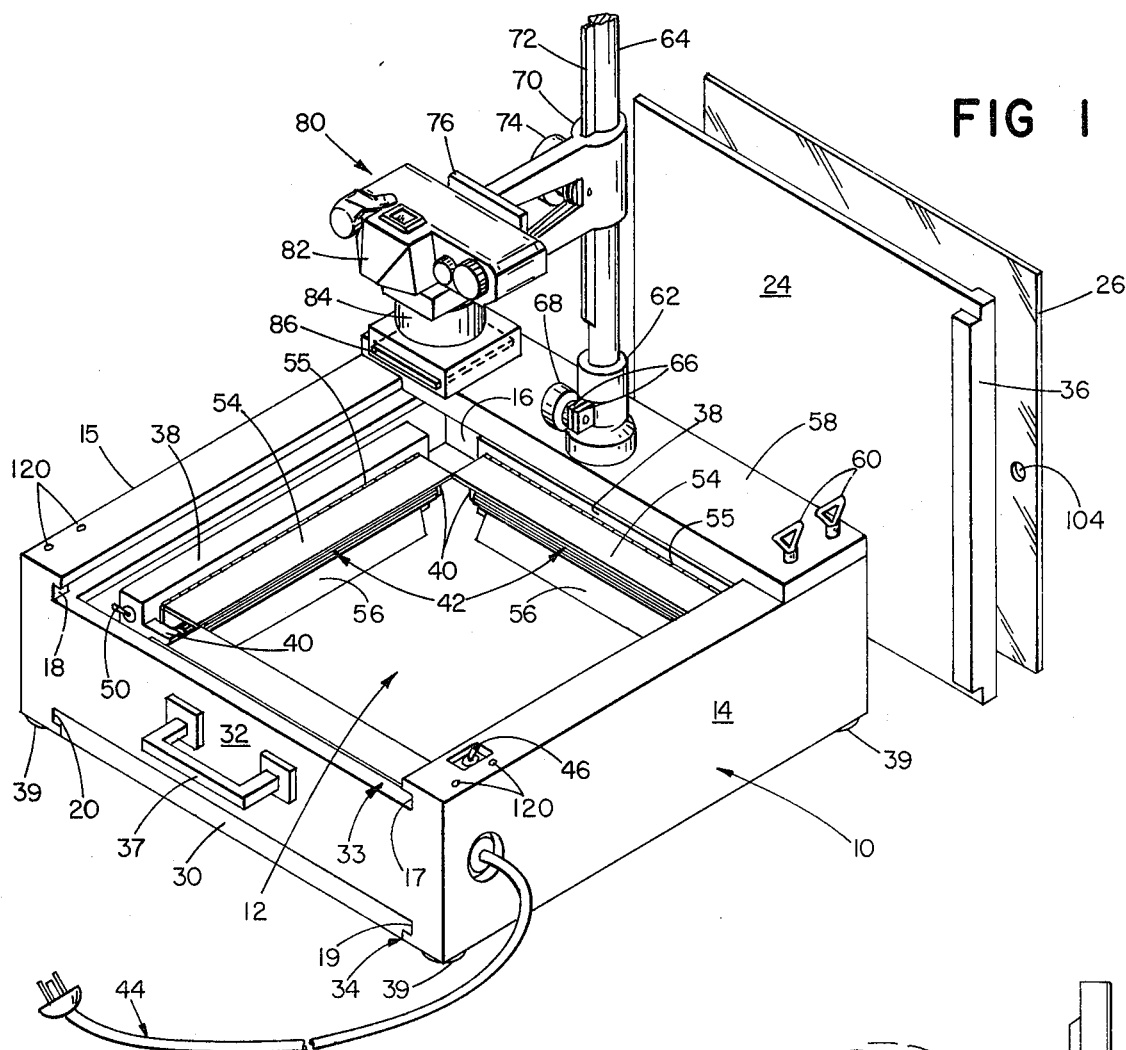
FIG 1
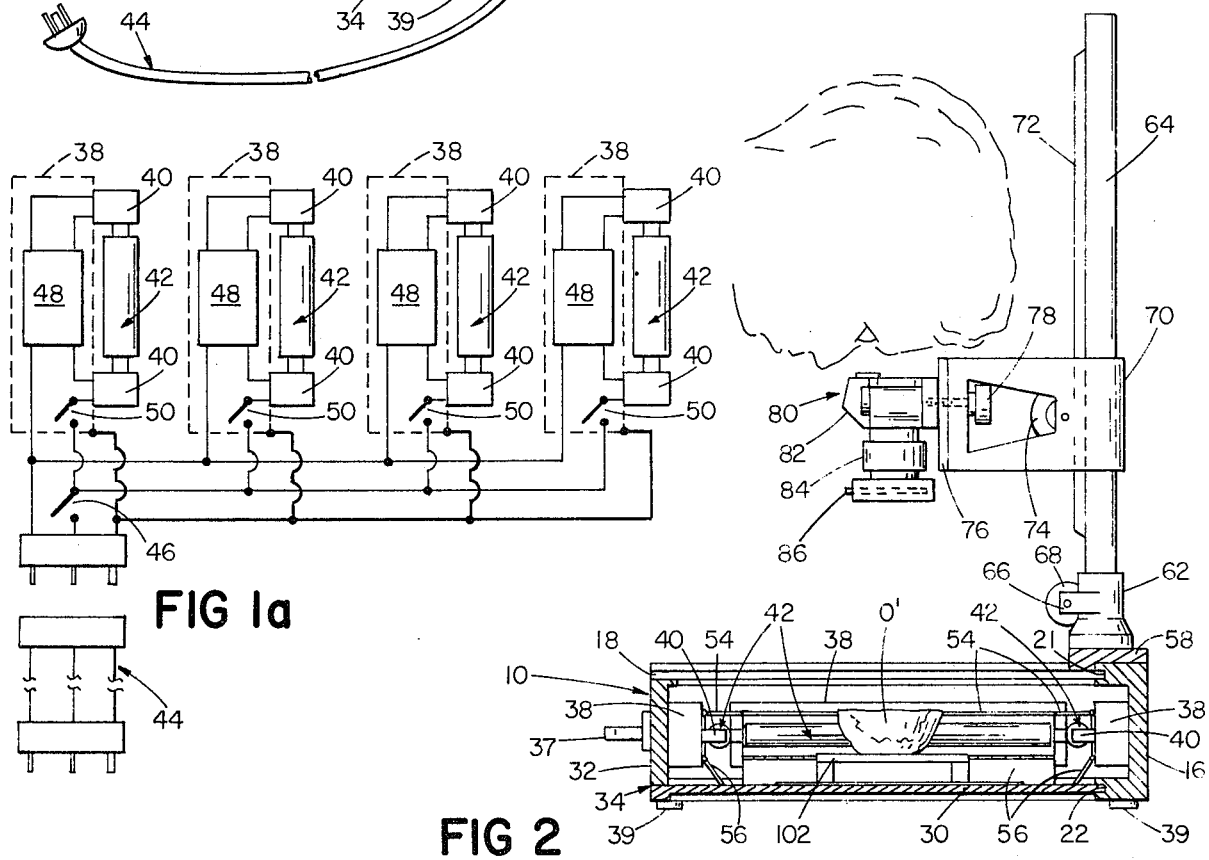
FIG 1a
FIG 2

PHOTOGRAPHIC LIGHT SOURCE

BACKGROUND OF THE INVENTION

1. Field of the Invention

This invention relates to photographic light sources for illuminating subjects to be photographed. More particularly, the invention relates to such a light source capable of general usage, for illuminating subjects in a wide variety of sizes and shapes, for photographing in color or black and white, with conventional cameras, shutter speeds and film, and utilizing conventional fluorescent white light tubes.

2. Description of the Prior Art

Photographic light sources heretofore proposed or available have had certain limitations. Many of them are limited to special purpose applications, such as document copying. Those intended for more general use have tended to be elaborate, expensive and difficult for an amateur photographer to utilize properly. In general, they have not utilized, or satisfactorily utilized, conventional electric lights suitable for household use and therefore readily commercially available. The filament type does not give proper lighting because of the inherent difficulties of evenly distributing light from a bright line source. The flourescent white light type gives an evenly diffused light which, while otherwise satisfactory, is much too heavily accented with green. As a consequence, special lights have been provided, such as special fluorescent tubes in which some of the green is inhibited, which are relatively expensive and limited as to supply source.

SUMMARY OF THE INVENTION

An object of this invention is to provide a photographic light source for the general purpose usage specified above which utilizes the light from ordinary fluorescent white light tubes suitable for household use in such a manner as effectively to suppress the green wavelengths relative to the remainder of the total light reaching the camera lens.

Another object is to provide such a light source with a lighting system so effective as to permit satisfactory color photographing of objects using conventional cameras, film, filter and shutter speeds without time exposure.

Another object is to provide such a light source which is uncomplicated and inexpensive to construct and which does not require expert skill to use properly.

Other objects are to provide such a source in frame form with removable parts for conversion between lighting subjects inside and outside the frame, for use in illuminating transparencies such as photographic slides for viewing or photographing, and for camera support, and with adjustable reflectors for varying light direction according to use.

To attain the foregoing objects, there is provided a boxlike frame with sockets for mounting and electrically connecting for continuous operation a plurality of fluorescent white light tubes distributed about and extending longitudinally of the inner sidewalls of the frame. Reflectors with light diffusing reflecting surfaces, mounted to extend between the sockets and about the light tubes mounted therein, have a position at which they reflect toward the interior of the frame and one face only thereof most of the direct light from the tubes. A support is provided for positioning an object to be photographed adjacent that one face of the frame intermediate the tubes and reflectors and exposed thereto and to the lens of a camera directed into the frame through its opposite face. The interior walls of the frame have light absorbent surfaces and at least a bordering region of the support has a light absorbent surface.

In preferred embodiments the support is a base closing the face of the frame toward which light is directed and reflected, having a light absorbent inner surface and being removable for photographing persons or objects disposed outside the frame, the frame is square, with each wall having light tube sockets, a wall length slightly longer than a standard length of fluorescent light tube and a depth of at least six inches with the sockets disposed at about mid-depth, the light absorbent material is flat black paint and the reflectors are at least in part adjustable about the longitudinal axes of the tubes and have a reflecting surface of flat white paint. Also it is preferred to provide additional plates for positioning on the frame for viewing or photographing transparencies such as photographic slides, a camera support removably attachable to the frame and switches for selectively shutting off the light tubes.

With the equipment described, particularly in its preferred form, essentially all the light is either directed or reflected onto the subject being photographed, or is absorbed. (If the subject is outside the frame, the frame may be extended by draping a black, light absorbent cloth about the subject). Thus, the camer lens "sees" only light reflected from the subject. Furthermore, more of the light reaching the subject is reflected thereon by the reflectors than is transmitted directly thereto by the tubes. This means that most of the light from the subject reaching the camera lens has been reflected at least twice, in some cases more times because of multiple reflections within the reflectors. Moreover, in the region bordering the frame face where the direct light is most intense, reflection is suppressed by light absorbent material.

The reasons for the effective suppression of the green that is obtained may not be fully understood. It is believed, however, that the relatively high proportion of diffuse reflected light that illuminates the subject has reduced intensity of wavelengths in the green and acts to reduce the green intensity in the combined total light reflected from the subject. The green is suppressed to such an extent that it can usually be sufficiently eliminated with one magenta and one red conventional gelatin filter superposed in front of the lens, such as Eastman Kodak CC20M and CC20R filters, which do not reduce the desired light sufficiently to require time exposures.

The fluorescent white light with the green so suppressed is ideal for photographic purposes, making possible clear, natural color or black and white pictures at normal shutter speed of 1/60th of a second, although time exposures may be desirable in some cases, for example, in the difficult color photographing of black and white subjects which becomes feasible utilizing equipment of this invention and longer exposures. Avoidance of time exposure in many cases permits rapid use in making multiple photographic copies. The device can be inexpensively made, it is inexpensive and easy to maintain in service due to the low cost and ready availability of the light tubes used, and it is also relatively light in weight and easy to use.

Of the commercially available fluorescent light tubes, the relatively low temperature, so called "cool white"

tubes have been determined to be most satisfactory. Such tubes made by General Electric Company, designated F15T8-CW, in 15 or 18 inch lengths, are presently preferred.

The foregoing and other features and advantages of the invention will be apparent from the ensuing particular description of the preferred embodiments shown in the drawings.

BRIEF DESCRIPTION OF THE DRAWINGS

In the drawings:

FIG. 1 is a view in perspective of one preferred embodiment of light sources according to the invention (hereinafter sometimes referred to as "light boxes"), with interchangeable additional parts shown separately, and camera support with camera mounted thereon shown attached to the light box;

FIG. 1a is a wiring diagram of the device of FIG. 1;

FIG. 2 is a view partly in vertical section, partly in side elevation, of the light box, support and camera of FIG. 1, with a user's head shown viewing an object to be photographed through the camera sight;

DESCRIPTION OF THE PREFERRED EMBODIMENTS

Figure 3:
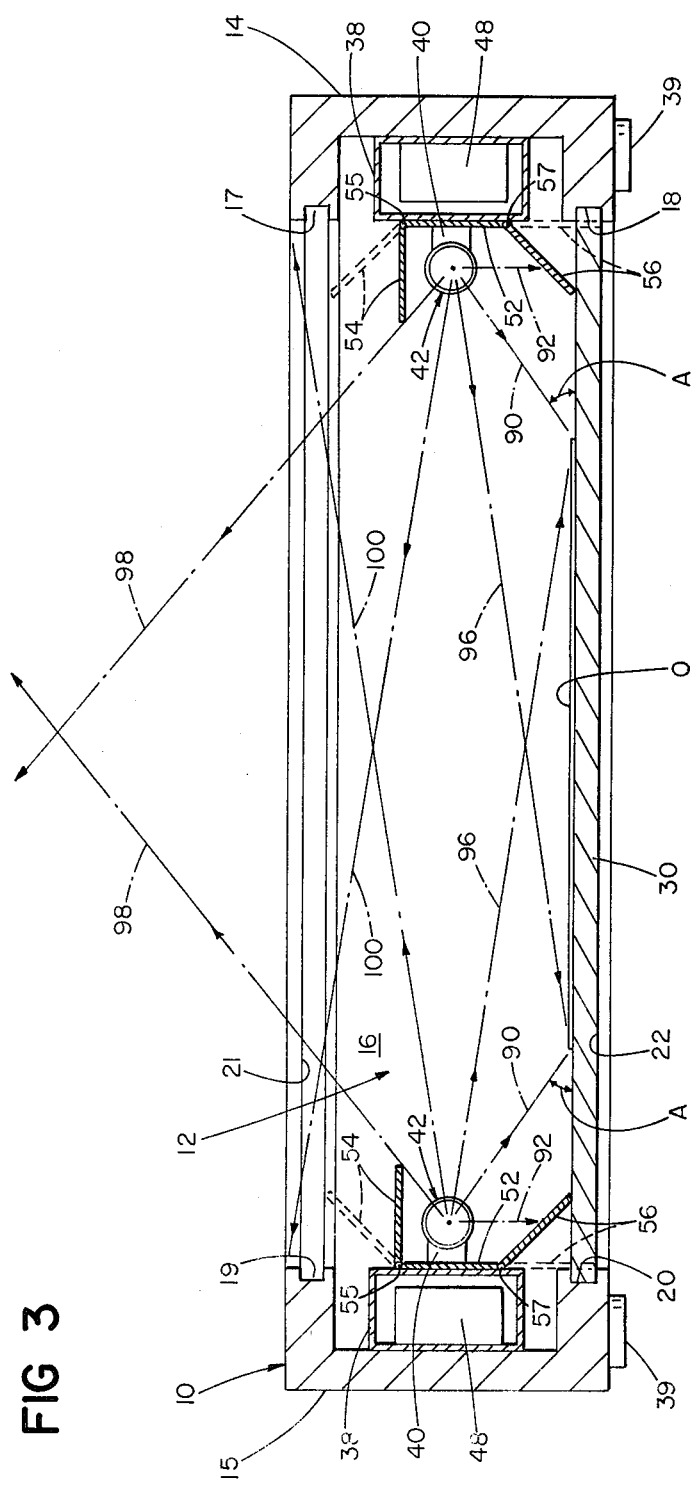
FIG. 3 is a vertical cross-section view through a light box according to FIG. 1, partially diagrammatic, showing changed part positions by dash lines and showing certain light directions by arrowed lines.

In the embodiment shown in FIGS. 1-5, the device has a four sided frame designated generally 10. As shown, the frame sides are solid walls secured together which may be of wood, metal or plastic, and are of equal length, forming a square interior compartment 12, closed at its sides. Two side walls 14 and 15 of the frame are of generally U-shaped cross-section (see FIG. 3), as is one end wall 16 (see FIG. 2). The corresponding ends of these walls facing inwardly of the box are provided with respectively mutually aligned slots, 17 and 18 on wall 14, 19 and 20 on wall 15 (FIG. 3) and 21, 22 on wall 16 (FIG. 2). Slots 17 and 19 form a slideway for the side edges, and slot 21 forms a seat for one edge of interchangeable parts shown removed in FIG. 1, these parts being a cover plate 24 and a plate 26 for supporting photographic slides for viewing. Slots 18 and 20 form a slideway for the side edges, and slot 22 forms a seat for the end edge, of a removable support plate 30 shown in place in FIG. 1.

The remaining wall 32 of the frame is flat and fits between extensions of the top and bottom wall portions of sides 14 and 15 to provide openings 33 and 34 (FIG. 1) ending in slots 17 and 19 and slots 18 and 20 respectively to permit entry of the respective plates therein. Cover plate 24 has a thickened portion 36 at one end which fits and closes opening 33 when the cover is slid in place. The remainder of this plate is thinner than the depth of the slots 17, 19 and 21 such that the cover can be slid in place over plate 26 positioned in these slots, plate 26 being shorter than plate 24 by the width of thickened portion 36 of plate 24. Thus, plate 26 can be stored in the light box when it is not in use and closed by cover plate 24. Support plate 30 may, as shown, be of uniform thickness fitting slots 18, 20 and 22 except for an enlargement filling opening 34. A handle 37 is provided on wall 32 for carrying the box. Feet 39 extend from each corner of the frame for supporting the light box on a horizontal surface when the device is used as in FIG. 1.

On the inner face of each wall 14, 15, 16 and 32 is mounted an electrical connection box 38 from each end of which a socket 40 extends inwardly to receive one end contact of a white light fluorescent light tube 42. Sockets 40 electrically connect tubes 42 to a source of A.C. 115 V. current through plug cord 44, an on-off switch 46, ballasts 48 (FIG. 1a) in boxes 38, and an individual on-off switch 50 for each light tube (one shown in FIG. 1), the wiring connections being diagrammatically shown in FIG. 1a. Mounted flat on the face of each box 38 is a first reflector 52, extending longitudinally of the light tube 42 for its full length, and having a width greater than the diameter of the tube on which it is centered. Second and third reflectors 54, 56 are mounted by respective hinges 55, 57 to the respective longitudinal edges of reflectors 52 so that they are at opposite sides of the tube 42. The reflective faces of the reflectors are light diffusing such as formed by a coating of flat white paint. Hinges 55, 57 are sufficiently stiff to hold reflectors 54, 56 in desired position between parallel and normal to reflector 52.

A base member 58 of a removable camera support structure is shown in FIGS. 1 and 2 mounted on one end of walls 14 and 15 and secured thereto by wing bolts 60 extending therethrough at each end into threaded sockets 61 (FIG. 4) in one end of walls 14 and 15. Fixed to the center of member 58 is a tubular socket 62 for receiving one end of a camera support bar 64. Socket 62 is provided centrally with cut out portions terminating in flanges 66 and which can be pressed inwardly of socket 62 to grip bar 64 by means of adjusting bolt 68 received through aligned threaded sockets in flanges 66.

A camera support member has a tube 70 at one end sized to fit over bar 64 and provided with a notch fitting over a rib 72 extending longitudinally of bar 64 so that tube 70 is non-rotatably slidable on bar 64. A fastening bolt 74 is threaded through tube 70 and can be adjusted to bear on bar 64 to hold the camera support member in desired position longitudinally of bar 64. A pair of arms extending from tube 70 hold a support plate 76 which engages flat against the side of a camera opposite the camera sight, and has a threaded bolt 78 extending therethrough which is received in the threaded aperture conventionally provided in cameras for support purposes. The particular camera 80 shown in FIGS. 1 and 2 is a conventional 35 mm camera with sight 82, lens holder 84 and filters holder 86. Any type of camera from 35 mm to 8 by 10 inches that has a lens focal range down to 1½ feet may be used. As shown, the support member holds the camera with the lens approximately centered on support member 30.

The length of the sides of frame 10 is such as to accommodate the length of fluorescent light tubes to be used leaving a reasonably small gap between adjacent tube ends. For the commonly commercially available tube length of 18 inches the frame sides may be 26½ inches external length with opposite light tubes spaced apart at their closest points about 20 inches if of 1 inch diameter and about 19 inches if of 1.5 inch diameter.

The reflectors 52, 54, 56 are preferably about two inches wide, so that reflectors 54 and 56 extend inwardly beyond the light tubes when positioned at a right angle to reflector 52 a distance between about one-fourth and three-fourths of an inch. The depth of the frame sides may be about 6 inches or more. Support member 30 may be spaced from reflectors 56 such as to prevent, by engagement therewith as shown in FIG. 1, complete pivoting thereof on their hinges to a position parallel to reflectors 52, which is not desirable for photographing objects within the frame.

FIG. 3 illustrates the positioning for photographing in the frame of FIG. 1 a thin flat object O such as a document, photograph, painting or the like or a colored or white background sheet for another object to be photographed placed on or over it. The object is centrally positioned on support member 30 so that its marginal edges are spaced from the adjacent light tubes. For best results as hereinafter explained, the spacing of each edge of the object O from the adjacent light tube 42 is such that the angle A between the surface of member 30 and a line 90 connecting the axis of the tube 42 with the adjacent edge of the object is substantially less than 90°, preferably less than 60°. Such spacing is normally at least two inches from a line 92 from the light tube axis perpendicular to the surface of member 30. In addition, the supporting surface of member 30 should be non-reflective in the area not covered by the object or shielded by reflector 56, which, if the member is not made of light absorbent material, may be accomplished by providing a light absorbent coating such as dull black paint on the entire surface. It has been found in practice that if this area is reflective, photographs even with filters tend to show a greenish halo on or around the margins of the object.

Continuing to refer to FIG. 3, it will be seen that the direct rays from each tube 42 which are directed onto the object are only from a relatively small angular sector of the tube between line 90 and a line 96 from the tube to the far margin of the object, as indicated, about 30° or less. On the other hand, the direct rays directed into the bordering region beyond line 90 are from a larger sector of the light tube, they are more intense because the region is closer to the tube, differing by the square of the respective distances, and they are spread over a much smaller area. These differences apparently account for the desirability of suppressing reflection toward the camera from this region.

In their full line positions, reflectors 54 are shown parallel to the surface of member 30 and the face of the frame containing it, while reflectors 56 engage that surface at an angle between them somewhat less than 45°. This is a desirable position of the reflectors for photographing objects of the type under discussion. In this position the only direct rays from each light tube that escape from the frame are from the small sector thereof, lying between a line 98 from the tube axis to just pass the outer edge of the adjacent reflector 54 and a line 100 from that axis to just pass the upper edge of the opposite wall of the frame. This sector is substantially less than 25 percent of the periphery of the tube and hence emits only a correspondingly small percentage of the light. The angle of these rays escaping the box to the perpendicular is such that they do not penetrate the filter and lens system of the camera to any significant extent.

Of the light that is directed into the frame, a minor portion from each light tube is directed onto the opposite wall of the frame above the opposite reflector 54. It is desirable to prevent reflection of light from the frame walls and parts mounted thereon except the interior of the reflectors and the light tubes and hence, if not inherently nonreflective, they may be coated with a light absorbent material. By far the greatest part of the light from each tube is directed into the reflector system associated with it or across from it.

The light reflected from the diffusing reflecting surfaces of the reflectors is diffused or scattered, because light directed thereto at a given angle will have different angles of incidence thereon according to varying surface characteristics of the diffusing surface. It is therefore not possible to give a precise point-by-point diagram of the reflected light pattern according to angle of incidence equals angle of reflection, as it would be if the surface were polished or mirror reflectors. Instead, it is reasonable to assume that the reflected light from the reflectors is more or less uniformly distributed between the limits of possible reflection, i.e., nearly parallel to the surface, particularly since the light from tubes 42 is somewhat diffused and the light impinging on the reflectors includes light reflected from other reflectors and directed thereon from opposite tubes.

On this assumption, it will be seen that the reflected light from each reflector 54 will be reflected through a zone comprising its associated reflectors 52 and 56 and light tube 42, member 30 and object O thereon and the opposite reflector system and light tube. The reflected light from each reflector 52 will be reflected through a zone comprising its associated reflectors 54 and 56 and light tube 42, member 30 and object O thereon, the opposite side of the frame including its reflectors and light tube, and possibly some distance above it which may receive some light from the lower end of this reflector. The reflected light from each reflector 56 will be reflected through a zone comprising its associated reflectors 52 and 54 and light tube 42, member 30 and object O thereon, the opposite side of the frame including its reflectors and light tube, with possibly a small amount from its lower end distributed through an area above the frame bounded by lines drawn from its lower edge through the inner tip of the opposite frame side and through the inner tip of its associated reflector 54, respectively. It will therefore be evident that nearly all the light from the reflectors is reflected toward member 30 or the sides of the frame, with the greater part directed toward member 30.

Thus the object O is bathed with light from the reflectors which has been already at least once reflected. This reflected light, mixing with the direct light from the tubes is not only important from the standpoint of providing an even, uniform, adequate lighting but is also believed to be an important factor in suppressing or reducing the intensity of the green component of the light reflected by the object, to such an extent that the undesired greenish tone can be eliminated with the filter combination previously mentioned.

FIG. 2 illustrates use of the device for photographing a more three dimensional object O'. Such an object may be placed directly on support 30, with or without a background reflective sheet such as O in FIG. 3, or with an intermediate support stand 102 as shown. The object O' is receiving direct light from the sector of each light lying between lines 96 and 100 drawn therefrom in FIG. 3. It is also receiving reflected light from the reflectors, from a reflective background sheet O if one is used, and from the top of support 102 if that is reflective. To provide more interior light, reflectors 54 may be elevated somewhat from their full line positions shown in FIGS. 2 and 3, toward their dash line positions in FIG. 3.

For taller objects than the one shown, further elevation of reflectors 54 will normally be required, and some elevation of reflectors 56 may be desirable. For very tall objects it is possible to stack a second frame 10 on top of a first one to obtain the requisite lighting, the upper frame having the camera support structure, if that is used, and having its support member 30 removed. Highlighting and shadow effects may be obtained by turning off one or two of the light tubes by means of switches 50.

Figure 4:
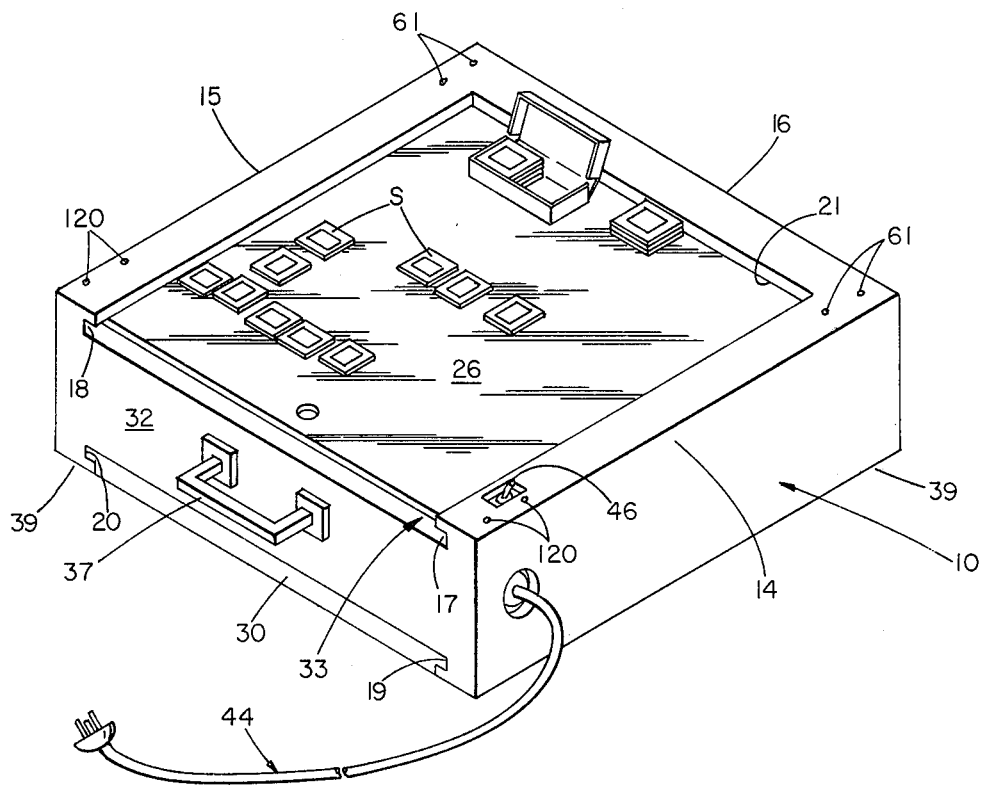
FIG. 4 is a view in perspective of the light box of FIG. 1 as used for photographic slide viewing.

FIG. 4 illustrates use of the device of FIG. 1, with the camera supporting structure removed, for viewing photographic slides. For such use plate 26 is positioned in the slideway provided by slots 17, 19 and 21, closing the top of the frame. Plate 26 is a sheet of translucent plastic material provided with a finger hole 104 (FIG. 1) to assist in manipulating it. In the interior of frame 10 not shown in this Figure, a reflective sheet O is placed on support 30, for this use completely covering it, and the reflectors 54 are raised to their dash line positions, so that plate 26 receives direct and reflected light over its entire area. The slides S to be viewed are placed on plate 26 in this area, and since the area is large, many slides can be correlated together for viewing, as many as 121 35 mm slides.

The slides are lighted through plate 26 by direct light from most of the upper inner quadrant of light tubes 42 and by reflected light from the reflectors and the reflective sheet O on member 30. The translucent sheet assists in suppressing green and the resultant lighting is excellent for such viewing.

Figure 5:
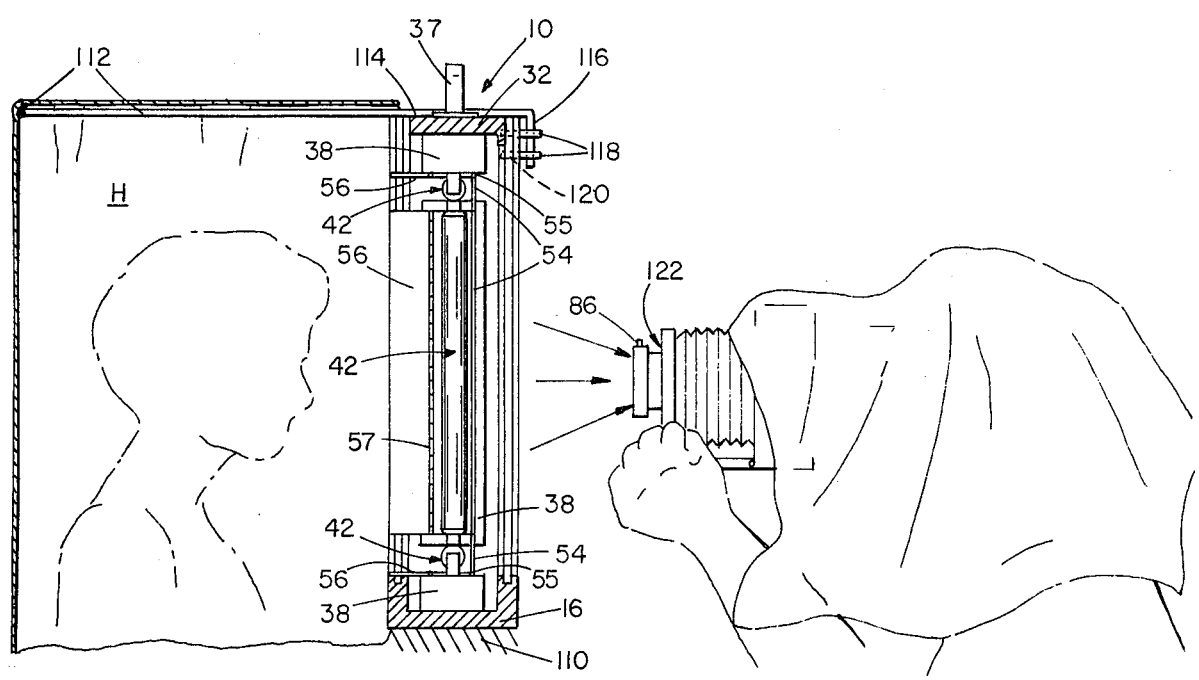
FIG. 5 is a view partly in vertical section, partly in side elevation of the light box being used for photographing a person.

FIG. 5 illustrates use of the device of FIG. 1, again with the camera support structure removed, for photographing a subject outside the frame, in this instance for portrait photography of a person. In this case, support member 30 is removed and the frame is placed on a support surface 110 at suitable level on its side 16 with its face from which member 30 was removed toward the subject. Reflectors 56 are pivoted to their dash line positions in FIG. 3 parallel to reflectors 52. Reflectors 54 may be in their full line positions in FIG. 3 or pivoted slightly toward their dash line positions.

Light from the tubes 42 is directed toward the subject from part of their lower inner quadrant and is reflected on the subject from all the reflectors. The subject should be shielded from external fluorescent light such as room lighting, which may be done by draping a black cloth around the subject. Such a cloth in the form of a hood H of boxlike configuration, open on the one side to face the frame 10 and at one end, of similar dimensions to the frame as shown, may be provided with the device, together with a hanger for supporting it from the frame. This hanger may be simply a wire frame 112, of generally rectangular three-sided form, of a size to fit within the upper end of hood H, with two side portions 114 projecting outwardly to overly side 32 of the frame 10 and terminating in end portions 116 bend inwardly to be received through eye bolts 118 threaded into aligned sockets 120 (see also FIG. 4), provided in the ends adjacent side 32 of sides 14 and 15 in the face of frame 10 away from the subject.

The photographer is shown utilizing a conventional portrait camera 122 mounted on a tripod (not shown), provided with a filter holder 86 in which the filter combination mentioned above will normally be placed. The lighting of the subject by this arrangement is excellent, the green is adequately suppressed and the hood desirably absorbs light from the device which is not reflected from the subject to the camera, as well as external light. A tripod such as contemplated in FIG. 3 may be used instead of the camera support structure of FIG. 1 for photographing objects within frame 10, but the support structure is considerably better and easier to use.

Two frames 10 may sometimes be used advantageously together in photographing large objects outside them. In such a use, the object is placed between the two frames on a suitable support. The frame away from the camera has its upper face in FIG. 1 toward the object with support member 30 in place and a diffusing reflecting sheet preferably over it. The frame toward the camera has member 30 removed from its face toward the object, so that the object may be photographed through its opposite face. A black cloth is usually draped over the upper ends of the boxes and the object between them. The frame nearest the camera may have it reflectors adjusted as described in connection with FIG. 5. The other frame may have its reflectors adjusted as described in connection with FIG. 4.

In addition to slide viewing plate 26, a plate of like dimensions for use in photographing slides may be provided for insertion in slots 17, 19 and 21. Such a plate and its use are not shown or described in connection with this embodiment, since they are shown and described in connection with the modified embodiment of FIGS. 6 and 7.

Figures 6, 7:
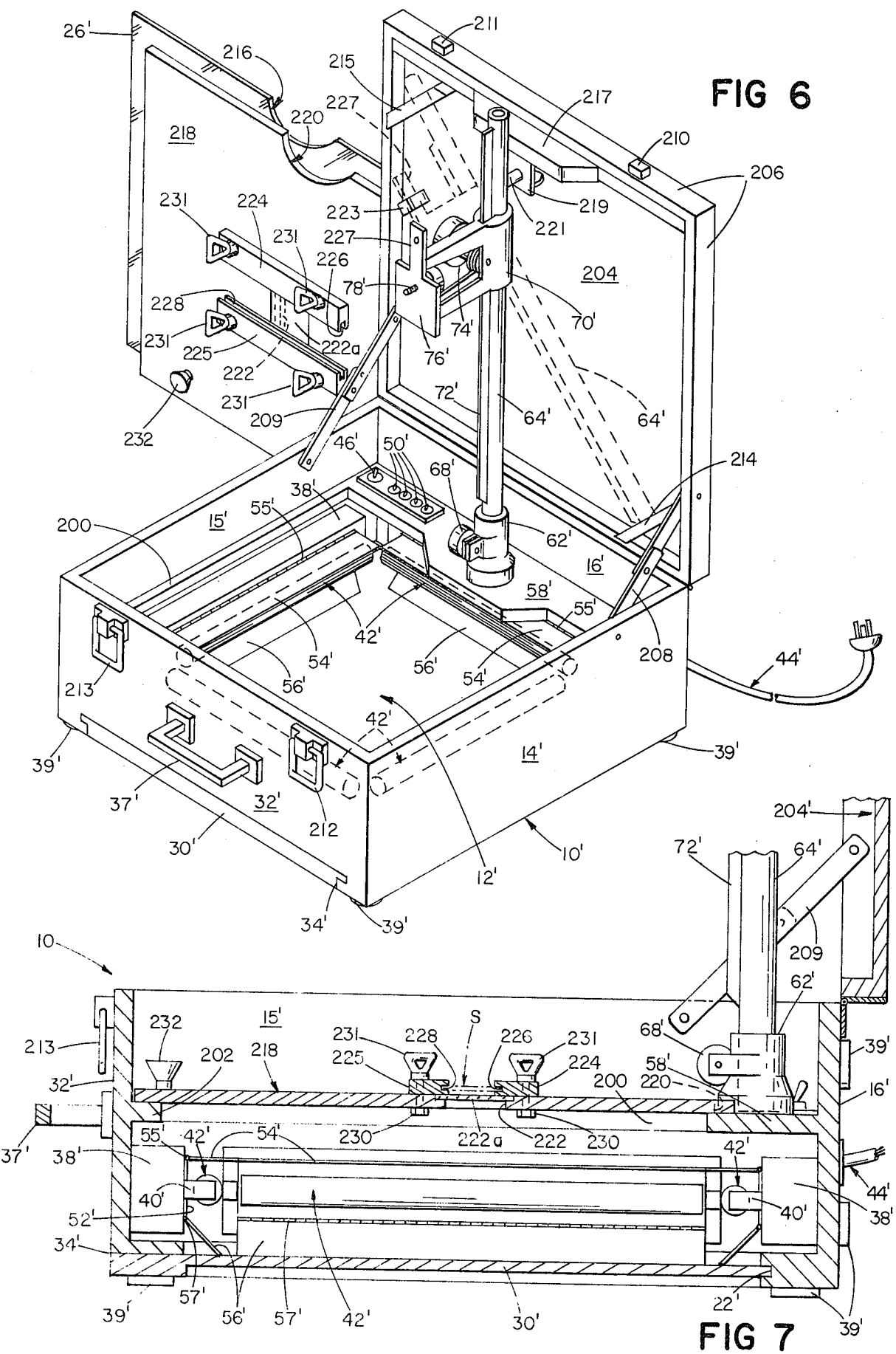
FIG. 6 is a view similar to FIG. 1 of a modification.
FIG. 7 is a vertical cross-section view of the light box of FIG. 6 as used for photographic slide reproduction.

The modification of FIGS. 6 and 7 is closely similar to the device of FIG. 1, except that the frame is deeper, it has the base member of the camera support structure fixedly mounted within it, and it has a recessed hinged cover which is provided with fixtures to receive and retain for storage the demountable parts of the camera support structure. This modification is intended primarily for photographing in the light box or for slide viewing or slide viewing rather than for photographing through the frame, which is more readily effected with the embodiment of the previous Figures. The modified embodiment has the advantages of the fixed rather than attachable base member of the camera support structure, and convenience of storage within the box of the remainder of the camera support structure. Also, a plate for photographing slides is shown, of a structure which may also be utilized with the embodiments of the previous Figures.

Referring to FIGS. 6 and 7, wherein primes of the same reference numerals denote parts corresponding to those of the previous Figures, sides 14', 15', 16' and 32' correspond to correspondingly numbered sides of the previously described embodiment, except that they are uniformly deeper by three to four inches, are L shaped with the branch of the L at the base, and lack the slideway at the top provided by slots 18, 20 and 22 and opening 33 thereto of the previously described embodiment, but as in that embodiment they are provided with a slideway for removable support member 30', slot 22' only of this slideway and opening 34' thereto being shown in FIGS. 6 and 7. Member 30' may be the same as member 30 including its light absorbent upper surface. The light tubes 42', their mountings, reflectors and electrical connections except the individual switches, are all the same as their counterparts in FIGS. 1-5, except that rod 64' has threaded opening (not shown) near its top for use in attaching the rod to the cover when the structure is in use and plate 76' has an upward extension used in storing the demountable system, as hereinafter described.

Fixedly secured to the inner surface of frame side 16' and adjacent inner surfaces of sides 14' and 15' is support member 58' having secured thereto tubular socket 62' for demountably receiving bar 64' of a demountable camera support system like that of FIGS. 1-5. Member 58' has extensions secured along frame sides 14' and 15', one of these, 200 on wall 15' being shown in FIG. 6. The upper surfaces of these extensions are flush with the upper surface of member 58' and also with the upper surface of a ledge 202 secured to the inner face of frame side 32', so that these parts collectively form a supporting frame for the edges of the slide viewing and photographing plates. The main on-off switch 46' and the individual light switches 50' are mounted on member 58' for easy access.

The cover 204 of this light box is of the same size as the frame 10' and has a depending marginal frame 206 which rests on the sides of frame 10' when the cover is closed. The depth of the recess provided by this frame 206, plus the distance of the top of member 58' from the upper edges of frame 10', are slightly greater than the height of socket 62' above members 58'. The cover is hinged to the box by folding hinges 208, 209, secured at their ends to the inside of opposite sides of frame 206 and of slides 14', 15' respectively of frame 10'. The side of frame 206 which rests on side 32' of frame 10' when the cover is closed, has a pair of projecting lugs 210, 211 over which pivoted latch members 212, 213 on side 32' may be respectively engaged to retain the cover in closed position. This side of the frame has a ledge 217 depending from inside frame 206 and carrying a plate 219 through which a wing bolt 221 extends and may be screw threaded into a suitable opening (not shown) in rod 64' near its top when the cover is open and the rod is in socket 62'. This adds stability to the camera supporting structure such that it is unnecessary to use a cable release for the camera shutter.

The recess provided by frame 206 on cover 204 is deep enough and long enough diagonally to accommodate rod 64' with its camera support structure when removed from socket 62', as indicated by dash lines in FIG. 6. Suitable retainers 214, 215 engaging rod 64' near its ends and a retainer 223 engaging an extension 227 on plate 76', are provided in the cover to retain the rod and its camera support therein.

A slide viewer plate for this embodiment 26' is the same as its counterpart 26 in the previously described embodiment except that it has a curved notch 216 cut in one end to fit around the base of socket 62' when placed for viewing with that end resting on member 58', its sides on the extensions thereof and its other end on ledge 202. A plate 218 is also provided, like plate 26' sized to fit within the top of frame 10' and to rest on the same supporting structure (FIG. 7), also having a notch 220 fitting around the base of socket 62'.

Plate 218 is opaque but has a central square viewing opening 222 having fitted therein an optical glass insert 222a which is preferably masked on its underside edges with black paint to provide a viewing area the size of a 35 mm slide. On opposite sides of opening 222 on one face of plate 218 are secured a pair of strips 224, 225 having opposed aligned grooves 226, 228 in their facing sides. Grooves 226, 228 form a slideway for the opposite edges of photographic slides S to be photographed. Bolts 230 and wing nuts 231 attach strips 224, 225 to plate 218 and by tightening or loosening the wing nuts the grooves 226, 228 may be slightly restricted or enlarged.

Use of the modification of FIGS. 6 and 7 to photograph objects inside the frame 10' is the same as described in connection with previous Figures, including adjustment of the reflectors, as is its use for slide viewing. In use of plate 218 for slide photography, the plate is positioned on its supporting structure in the light box as shown in FIG. 7, with the strips 224, 225 disposed upwardly. A knob handle 232 facilitates handling of this plate. A slide S is inserted in the slideway formed by slots 226, 228, and centered over opening 222. The slideway formed by slots 226, 228 may be squeezed together slightly by tightening wing nuts 231 to lock the slide in position. A reflective sheet is placed over support member 30 and the reflectors may be adjusted as for slide viewing.

With the camera support rod 64' positioned in its socket 62' as in FIG. 2, the lens of a camera secured to attaching bolt 78' will be approximately centered over opening 222 and a slide S positioned thereover, and photographing proceeds in the manner illustrated in FIG. 2. The picture on transparent slide S is reproduced by the camera, and it has been found in practice that the light provided by the box is such that this most difficult operation of photographing slides can be very satisfactorily performed without time exposure and with the filter combination mentioned above over the camera lens. This enables rapid photographing of a succession of slides, which may be pre-positioned in slots 226, 228. To shield the operation from outside light if it is fluorescent, the photographer may use a dark room, or a black cloth draped over the camera support rod and the light box.

Various other modifications are, of course, possible. While it is preferred to provide closures for the opposite faces of the frame, they are not essential. If support member 30 or 30' is omitted, the frame may be placed on a light-absorbent support surface, such as a table top covered with a black cloth. Alternatively, member 30 or 30' may be fixed to the frame, although it is preferred to have it removable to permit photographing through the frame or placing the frame about an object on a base too large to fit in it. The distance of the light tube axes above the frame face containing member 30 or 30' can be varied from that indicated (about mid-depth of frame 10 and two thirds the depth of frame 10', or about 3 inches). However, the tubes should be sufficiently removed from this face so that light from the inner lower quadrant of each tube will be directed substantially across the full width of that face. Increasing the distance tends to weaken the lighting undesirably.

The details of the demountable camera support structure shown are conventional and may be varied. A camera support structure similar to that shown that an extensible upper end and fixed in its base socket could be fixedly mounted within the inside of the cover of the embodiment of FIGS. 6 and 7, in position to stand upright when the cover is fully open as in those Figures.

I claim:
1. A photographic light source comprising:
    a boxlike frame;
    sockets for mounting and electrically connecting for continuous operation a plurality of fluorescent white light tubes distributed about the inner sides of said frame and extending longitudinally of said sides; and reflectors with light diffusing reflecting surfaces mounted to extend between said sockets and about light tubes mounted therein and having a position relative to said tubes at which most of the light from the tubes is directed and reflected into the interior of said frame and mainly toward one face only thereof, so that an object to be photographed may be disposed within and adjacent said one face of said frame and exposed to said directed and reflected light from the tubes and reflectors for photographing through the lens of a camera directed into the frame through the opposite face thereof;

said reflectors being at least in part adjustable about the axis of the light tubes with which they are associated and including reflector portions beyond said light tubes from said one face of said frame which are adjustable to a position in which their reflecting faces are substantially parallel to said one frame face.

2. A photographic light source according to claim 1 which includes a support for positioning an object to be photographed within the frame adjacent said one face thereof.

3. A photographic light source according to claim 2 wherein said support is removably mounted in said frame.

4. A photograhic light source according to claim 2 wherein said support closes said one face of said frame and has a flat inner surface which is light absorbent at least in the areas close to the light tubes.

5. A phographic light source according to claim 4 wherein the portions of the interior surfaces of the sides of said frame that are exposed to direct light from said light tubes are light absorbent.

6. A photographic light source according to claim 1 wherein said frame is substantially square and said sockets for mounting the fluorescent light tubes are positioned on each of the sides of said frame.

7. A photographic light source according to claim 6 wherein the walls of said frame are about twenty inches long.

8. A photographic light source according to claim 7 wherein said sockets are disposed to locate the longitudinal axes of the light tubes about three inches from said one face of said frame.

9. A photographic light source according to claim 6 which includes switch means for separately electrically connecting and disconnecting each of said tubes.

10. A photographic light source according to claim 1 wherein said reflectors include a first reflector disposed between a light tube positioned in said sockets and the adjacent side of said frame, and second and third reflectors pivoted along opposite side edges of said first reflector beyond opposite sides of said tube, one of said second and third reflectors including said reflector portion.

11. A photographic light source according to claim 10 wherein the other of said second and third reflectors is pivoted between a first position in which its reflecting surface is parallel to that of said first reflector and a second position in which its reflecting surface is inclined inwardly of said frame toward said one face thereof.

12. A photographic light source according claim 10 wherein said one of said second and third reflectors projects inwardly beyond the parallel diameter of said tube when in said position about one quarter to three quarters of an inch.

13. A photographic light source according to claim 1 which includes a plate member removably mountable across one face of said frame on which transparencies such as photographic slides may be positioned with one face thereof exposed to light from the interior of said frame and the other face thereof exposed to the exterior of said frame.

14. A photographic light source according to claim 13 wherein said plate member is translucent for viewing transparencies placed on the face thereof exposed to the exterior of said frame.

15. A photographic light source according to claim 1 which includes camera support means mountable on said frame for supporting a camera spaced outwardly of, and with the camera lens directed toward, the face of the frame opposite said one face.

16. A photographic light source comprising:
a boxlike frame;
sockets for mounting and electrically connecting for continuous operation a plurality of fluorescent white light tubes distributed about the inner sides of said frame and extending longitudinally of said sides;
reflectors with light diffusing reflecting surfaces mounted to extend between said sockets and about light tubes mounted therein and having a position relative to said tubes at which most of the light from the tubes is directed and reflected into the interior of said frame and mainly toward one face only thereof, so that an object to be photographed may be disposed within and adjacent said one face of said frame and exposed to said directed and reflected light from the tubes and reflectors for photographing through the lens of a camera directed into the frame through the opposite face thereof; and
an opaque plate member removable mountable across one face of said frame, said plate member being provided with an opening and means for retaining a photographic slide with a face thereof exposed to light from the interior of said frame through said opening for photographing of its opposite face.

17. A photographic light source according to claim 16 which includes camera support means mountable on said frame for supporting a camera spaced outwardly of, and with the camera lens directed toward, said opposite face of a said photographic slide positioned in said retaining means.

* * * * *

UNITED STATES PATENT AND TRADEMARK OFFICE
CERTIFICATE OF CORRECTION

PATENT NO. : 4,043,662
DATED : August 23, 1977
INVENTOR(S) : Peter J. Garfall

It is certified that error appears in the above-identified patent and that said Letters Patent are hereby corrected as shown below:

Col. 6, line 17, "surface" should be --surfaces--;

Col. 8, line 26, after "photographing", insert --photographic--;

Col. 8, line 48, "embodiments" should be --embodiment--;

Col. 9, line 25, "members" should be --member--;

Col. 10, line 56, after "shown", delete "that" and insert instead --but with--;

Col. 11, line 30, "photographic" is misspelled.

Signed and Sealed this

Twenty-second Day of November 1977

[SEAL]

Attest:

RUTH C. MASON
Attesting Officer

LUTRELLE F. PARKER
Acting Commissioner of Patents and Trademarks